United States Patent [19]

Cordes et al.

[11] 4,081,422

[45] Mar. 28, 1978

[54] THERMOPLASTIC MOLDING COMPOSITIONS FROM TEREPHTHALIC ACID-BUTANE-1,4-DIOL-BUT-2-ENE-1,4-DIOL POLYESTERS

[75] Inventors: Claus Cordes, Weisenheim; Hans-Josef Sterzel, Dannstadt-Schauernheim, both of Germany

[73] Assignee: Keil, Thompson & Shurtleff, Rheinland, Pfalz, Germany

[21] Appl. No.: 699,987

[22] Filed: Jun. 25, 1976

[30] Foreign Application Priority Data

Aug. 6, 1975 Germany .............................. 2535021

[51] Int. Cl.$^2$ ............................................. C08L 67/06

[52] U.S. Cl. .............................. 260/40 R; 260/45.7 P; 260/45.9 R; 260/45.95 D; 260/75 UA; 260/857 PE; 260/861; 260/873

[58] Field of Search ............. 260/75 UA, 75 A, 75 R, 260/861, 40 R, 40 P, 45.7 P, 45.9 R, 45.95

[56] References Cited

U.S. PATENT DOCUMENTS

| | | | |
|---|---|---|---|
| 2,435,429 | 2/1948 | Evans et al. ..................... | 260/75 UA |
| 3,838,106 | 9/1974 | Shuki et al. ..................... | 260/75 UA |

*Primary Examiner*—Lucille M. Phynes
*Attorney, Agent, or Firm*—Keil, Thompson & Shurtleff

[57] ABSTRACT

A polyester which is manufactured by polycondensing terephthalic acid, or its lower alkyl esters, with butane-1,4-diol and at least 5 mole % of but-2-ene-1,4-diol, based on the amount of diol employed.

8 Claims, No Drawings

THERMOPLASTIC MOLDING COMPOSITIONS FROM TEREPHTHALIC ACID-BUTANE-1,4-DIOL-BUT-2-ENE-1,4-DIOL POLYESTERS

The best-known thermoplastic linear polyesters are polyethylene terephthalate and polybutylene terephthalate. Molding compositions based on polyethylene terephthalate have high surface hardness and a high glass transition temperature of from 75° to 80° C. Polyethylene terephthalate can be processed by extrusion, to give films, semifinished goods and hollow articles. Moldings of polyethylene terephthalate can also be manufactured by injection molding. In recent times, polybutylene terephthalate has found increasing use as a thermoplastic polyester, above all for injection molding. Polybutylene terephthalate has advantages over polyethylene terephthalate for such applications. Above all it gives moldings having a very high impact strength, great hardness and high surface gloss. A further advantage of polybutylene terephthalate over polyethylene terephthalate is its high rate of crystallization. Thus, it is as a rule not necessary to add nucleating agents to the molding compositions; even without these agents, the compositions can be processed rapidly, with very short cycle times, and using low mold temperatures of about 60° C.

Both polymers are partially crystalline products, the essential advantageous properties of which in part result specifically from the crystallization which occurs. If the materials are modified, as is frequently desirable, in respect of other properties, e.g. melting point, glass transition temperature, solubility or compatibility with other polymers or additives by co-condensation with comonomers, the crystallization is adversely affected. As a result, the processing speed (cycle time), ease of mold release, degree of crystallization, hardness, rigidity and heat distortion point, etc., decline. A further unsatisfactory aspect of the above polymers is that when carrying out the melt condensation, higher viscosities are only achievable with considerable technical effort, and long reaction times. Furthermore, the rigidity achievable with the above polyesters is unsatisfactory above the glass transition temperature of the polymers, i.e., above about 40°–160° C.

It is an object of the present invention to provide polyesters which have a similar pattern of properties to that of polybutylene terephthalate, but do not suffer from the disadvantages described above. It is a further object of the present invention to provide a simple and rapid process of manufacture of polyesters of higher melt viscosity.

It is a further object of the invention to provide the means of modifying certain properties of the above polyesters, e.g. the glass transition temperature, melting point and modulus of shear, without adverse changes in the crystallization behavior.

Polyesters such as polyethylene terephthalate and polybutylene terephthalate suffer severe thermal degradation at the required processing temperatures of from 240° to 280° C, and this has an adverse effect on the mechanical properties. Hence, it was desirable to provide a polyester which could be processed at lower temperatures, without deterioration of mechanical properties.

We have found that the above objects are achieved by providing linear polyesters which contain terephthalic acid as the dicarboxylic acid component and butane-1,4-diol and but-2-ene-1,4-diol as the diol components, and wherein the content of but-2-ene-1,4-diol is at least 5 mole %, based on the (total) amount of diol employed.

Normally, copolyesters and other copolymers, whereof the corresponding homopolymers crystallize partially, become less capable of crystallization if a comonomer is incorporated. This also reduces the crystalline content, whilst this content is necessary for achieving high moduli of elasticity, moduli of shear and hence high heat distortion points. The addition of as little as from 5 to 10 mole % of a comonomer greatly impairs the crystallizability of a normally crystallizable polymer. If more than 20 mole % are added, only amorphous polymers are obtained, in most cases, and their maximum use temperature is limited by the glass transition temperature.

It is thus all the more surprising that the copolyesters according to the invention, containing up to 50 mole % of but-2-ene-1,4-diol, still exhibit crystallinities of more than 49% and have a modulus of shear which in the temperature range of from 50° to 130° C is in most cases one and a half times the modulus of shear of polybutylene terephthalate.

The copolyesters of the invention can be manufactured by conventional processes. Thus, terephthalic acid can be esterified with a mixture of butane-1,4-diol and but-2-ene-1,4-diol, using a molar ratio of terephthalic acid to diol mixture of from 1:1.2 to 1:2, at from 150° to 200° C, if appropriate at superatmospheric pressure. In a second stage, the low molecular weight reaction mixture is condensed at temperatures of up to 230° C, whilst continuously reducing the pressure down to 0.1 mm Hg and distilling off the excess diol mixture, so as to give the desired high molecular weight polyesters. The catalysts required for the second stage of the reaction are those conventionally used in the manufacture of polyethylene terephthalate or polybutylene terephthalate.

In an advantageous and preferred alternative process, dimethyl terephthalate can be trans-esterified with a mixture of butane-1,4-diol and but-2-ene-1,4-diol, using conventional trans-esterification catalysts, e.g. tetrabutyl orthotitanate, at from 130° to 200° C, the molar ratio of tetephthalic acid to diol mixture being from 1:1.2 to 1:2. In a second stage, the reaction mixture obtained in the first stage is then condensed to give the desired high molecular weight polyester up to 230° C, under reduced pressure, and whilst distilling off excess diol mixture.

In manufacturing the copolyesters according to the invention it is advantageous not to exceed 240° C, and preferably 230° C, during the polycondensation. This means that the polycondensation temperature is less than 240° C and that, at most, slightly higher temperatures occur, e.g., at the wall of the apparatus or in heat exchangers, pipelines or filters.

In a preferred embodiment of the invention, the relative solution viscosity of the copolyesters according to the invention is greater than 1.4 (measured in an 0.5% strength solution in a mixture of phenol and o-dichlorobenzene, in the weight ratio of 3:2, at 25° C).

Furthermore, in a preferred embodiment of the invention, from 10 to 80 mole % of but-2-ene-1,4-diol are used.

The polyesters according to the invention have melting points in the range of from 160° to 220° C and can be processed at up to 280° C.

A particularly advantageous feature is that at low processing temperatures the melts have a relatively high viscosity, of about 10,000 poise, whilst at high material temperatures, the compositions flow very easily and have viscosities of about 2,000 poise. Accordingly, the polyesters according to the invention are outstandingly suitable for applications where high melt viscosities are of advantage, e.g. the manufacture of semi-finished goods and profiles by extrusion, the manufacture of hollow articles by blow-molding, and the manufacture of films.

Advantageous temperatures for the manufacture of injection moldings are from 230° to 280° C. Because of the good flow of the polyesters of the invention at relatively high temperatures, moldings with thin walls and long flow paths can be manufactured easily. Injection moldings made from the compositions of the invention can be released very easily and can be manufactured with very short cycle times. Because of their very great toughness and high surface hardness, and their low melt viscosities, the polyesters of the invention can also be employed advantageously as coating agents for a great variety of applications.

The coatings can be produced by flame spraying, electrostatic spraying processes or fluidized bed coating.

An important advantage of the polyesters of the invention is that they can be processed by a variety of methods at low temperatures, of from 200° to 240° C, at which no significant thermal degradation occurs when using the conventional residence times, of from 2 to 30 minutes, in the melt. Compared to other copolyesters, the copolyesters of the invention can be processed at advantageously low temperatures without also exhibiting a lowered glass transition temperature, crystalline content or rate of crystallization. Thus, the mechanical properties and processing characteristics which result remain at the high level of those of the homopolyesters, e.g. of polybutylene terephthalate. In addition to having the advantage of short processing cycle times, a high modulus of elasticity, increased moduli of shear at elevated temperatures, a higher heat distortion point and very good impact strength, the copolyesters according to the invention have a processing temperature which, advantageously, is lower than that of other polyesters.

The copolyesters of the invention can be mixed with a plurality of other polymers, e.g. using an extruder. Particularly advantageous components to be used in the mixture are polyamides, polycarbonates, polytetrafluoroethylene and other polyesters. Thus, the tracking resistance can be improved by admixture of polyamides, the impact strength by admixture of polycarbonates and the kinetic friction properties by admixture of polytetrafluoroethylene.

If the polyesters of the invention are to be employed at low temperatures, the inherently good impact strength can be substantially increased further by admixture of up to 20% by weight of other polymers with glass transition temperatures below 20° C. Suitable examples are polyolefins, e.g. polyethylene, polybut-1-ene, polybutadiene, poly-4-methylpentene or poly-dec-1-ene. Another group of suitable polymers is derived from acrylic monomers, e.g. acrylic acid, acrylic esters, methacrylic acid and methacrylic esters. A group of particularly preferred polymers which, when admixed to the polyesters according to the invention, give excellent low temperature impact strengths are poly(ether-esters) of the type of "Hytrel". These preferably consist of polyester segments based on terephthalic acid and butane-1,4-diol and polyether blocks based on polytetrahydrofuran, the ether blocks having a molecular weight of from 400 to 10,000, and the poly(ether-esters) having a relative viscosity of from 1.5 to 4.

A further particularly preferred component for admixture in order to increase the impact strength of the polyesters of the invention is a terpolymer in the form of a graft copolymer. Such graft copolymers are manufactured by conventional processes of two-stage emulsion polymerization. In the first stage, a prepolymer based on butadiene or alkyl acrylates is produced and is at the same time slightly crosslinked by a small amount of bifunctional vinyl, acrylic or allyl compounds, e.g. diallyl phthalate. A mixture of styrene and acrylonitrile, in which the weight ratio of styrene to acrylonitrile may be from 70:30 to 85:15, is then polymerized in the presence of this prepolymer. The manufacture of suitable graft copolymers is described, e.g., in German Patent Nos. 1,260,135 and 1,238,207.

For many applications, molding compositions of increased rigidity are desired. In the case of the polyesters of the invention, this can be achieved simply by admixture of up to 50% by weight of reinforcing fillers. In general, any reinforcing agents can be used, e.g. minerals, metal fibers or metal flakes, carbon fibers, acicular minerals such as asbestos and titanate whiskers, titanium dioxide or talc. The preferred reinforcing fillers include glass fibers of diameter less than 20 $\mu$ or glass beads, which may be solid or hollow and have diameters of from 10 to 50 $\mu$, as well as talc and chalk. The glass fibers or glass beads employed as reinforcing agents are advantageously treated with a silane-based size to achieve a better bond between glass and polyester.

Since the polyester molding compositions of the invention, because of their great strength, can also be used at from 80° to 150° C, it is advantageous to provide them with stabilizers which improve the resistance to heat aging. In the compositions of the invention, suitable effective additives for this purpose are phosphorus compounds, sterically hindered phenols and especially monomeric or polymeric carbodiimides in amounts of from 0.05 to 5% by weight.

Examples of phosphorus compounds are alkyl esters and phenyl esters of phosphoric acid and of phosphorous acid, phosphonic acid esters, phosphinic acid esters, phosphines, phosphine oxides and metal salts of phosphinic acids, phosphenic acids, phosphoric acids and phosphorous acids.

A particularly preferred category of heat-aging stabilizers are carbodiimides. Aliphatic, aromatic and cyclo-aliphatic monocarbodiimides or polycarbodiimides, e.g. N-methyl-N'-tert.-butylcarbodiimide, N,N'-dicyclohexyl-carbodiimide, N,N'-diphenylcarbodiimide, N,N'-di-p-tolyl-carbodiimide, N,N'-bis-(2,2'-diethyldiphenyl)-carbodiimide and N,N'-bis-(2,2'-6,6'-tetraisopropyldiphenyl)-carbodiimide may be used. Polycarbodiimides, e.g. hexamethylene-$\omega,\omega'$-bis-cyclohexylcarbodiimide, and aromatic polycarbodiimides of the formula

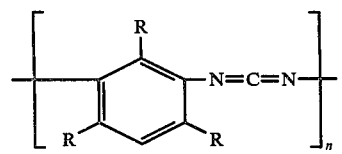

where R is hydrogen or alkyl or 1 to 4 carbon atoms and n is a number from 2 to 20, have proved particularly effective.

Aromatic monocarbodiimides with polar substituents, e.g. halogen and nitro, have the advantage that they are partially or completely soluble in the copolyesters of the invention. Only low shearing forces need be applied, when incorporating these carbodiimides into the polyester molding compositions, to achieve sufficiently fine distribution of the heat-aging stabilizer in the molding composition.

Examples of aromatic carbodiimides of the formula

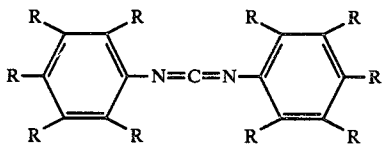

which are soluble in the copolyesters of the invention are those which contain 4 chlorine atoms or 6 chlorine atoms or 2 chlorine atoms and 2 nitro groups or 2 methyl groups and 2 nitro groups. At least one of the substituents R in the ortho-position to the carbodiimide group must be other than hydrogen.

The stabilizers can also be added to the reaction batch during the manufacture of the copolyesters of the invention, namely by adding them to the esterification or reaction product before the condensation stage and then carrying out the polycondensation in the manner described.

For some purposes it is advantageous further to increase the rate of solidification of the polyester molding compositions of the invention, which inherently is in any case very high. Such measures are of advantage particularly where extremely thin-walled moldings are to be produced very rapidly, and with accurate dimensions, by injection molding. This is achieved by adding from 0.001 to 1% by weight of crystallization accelerators.

In general, inorganic materials such as metal oxides, salts, talc, glass powder and metals can be used, and amongst these talc is particularly preferred. However, the alkali metal salts of monobasic and polybasic carboxylic acids and sulfonic acids may also be employed as nucleating agents. The nucleating agents should have a particle size of less than 100 μ.

The polyesters of the invention may be mixed with the additives described above by a variety of methods. The mixing temperatures may be from 10° to 50° C above the melting point of the particular polyester, and the residence times at these temperatures should not exceed from 4 to 8 minutes. Thus, e.g., the polyesters and various additives may be fused, and mixed with short chopped staple glass fibers, in an extruder. All types of extruders, e.g. single-screw and twin-screw machines, may be used. Kneaders are also suitable mixing apparatuses. If only relatively small amounts of additives, e.g. stabilizers or crystallization accelerators, are to be admixed, it may be advantageous, e.g. to prepare a concentrate of these additives in the polyester, and then add this concentrate, in a second stage, to the main part of the polyester, using mixers, e.g. static mixing apparatuses.

The Examples which follow illustrate the invention. The Examples describe individual measures for this purpose, but not a combination of several measures, so as to show the results unambiguously. However, all the measures provided by the invention may be combined with one another.

EXAMPLE 1

This Example describes the preparation of a copolyester of the invention, containing 30 mole % of but-2-ene-1,4-diol. 12 kg of dimethyl terephthalate, 5.85 kg of butane-1,4-diol and 2.46 kg of but-2-ene-1,4-diol are charged into an autoclave of 25 liters capacity, equipped with a stirrer, a vacuum unit, the customary control equipment and an oil-heated jacket. After the components have been fused at 130° C, 6 g of tetrabutyl orthotitanate are added. After a short time, the transesterification reaction commences and methanol is distilled off. The reaction temperature is raised to 210° C in the course of two hours, during which a total of 3.9 kg of methanol are distilled off. The pressure is then reduced to 40 mm Hg in the course of 1 hour and from 40 mm Hg to not more than 0.5 mm Hg in the course of a further hour. At the same time the reaction temperature is raised to 225° C. Stirring is continued for 1.5 hours at 225° C, during which time the viscosity of the melt rises continuously. The autoclave is then discharged by using superatmospheric pressure, and a polyester of relative viscosity 1.69 is obtained.

EXAMPLE 2

This Example shows the crystallite melting points Tm, glass transition temperatures Tg and X-ray crystallinities Wc of copolyesters of the invention, in comparison to polybutylene terephthalate and to a copolyester A based on butane-1,4-diol, 70 mole % of terephthalic acid and 30 mole % of adipic acid. The crystallite melting points were obtained by differential calorimetry, using a rate of heating of 32° C/min, after prior heating for 5 minutes at 20° C above the melting point, and cooling at 16° C/min. The temperature of the maximum of the melting peak was recorded. The glass transition temperature was measured by the tortional vibration method of DIN 53,445. The position of the damping maximum was quoted as the glass transition temperature. The values obtained are listed in Table 1.

These show that the copolyesters of the invention have lower crystallite melting points then polybutylene terephthalate, but a crystallinity comparable to that of the latter. High crystallinity is needed in order to achieve, e.g., high moduli of elasticity and of shear, high surface hardness, solvent resistance and good mold release.

TABLE 1

| Polyester | Mole % of but-2-ene-1,4-diol | $\eta$rel | Tm[° C] | Tg[° C] | Wc[%] |
| --- | --- | --- | --- | --- | --- |
| Polybutylene terephthalate | — | 1.66 | 221 | 55 | 55 |
| Copolyester A | — | 1.58 | 173 | −25 | 28 |
| Copolyesters of the invention | | | | | |
| 1 | 16 | 1.64 | 214 | 55 | 55 |
| 2 | 20 | 1.685 | 212 | 55 | 56 |
| 3 | 30 | 1.690 | 203 | 55 | 50 |
| 4 | 40 | 1.60 | 195 | 53 | 49 |
| 5 | 50 | 1.58 | 186 | 52 | 48 |
| 6 | 60 | 1.57 | 174 | 48 | 46 |
| 7 | 70 | 1.63 | 166 | 45 | 46 |
| 8 | 80 | 1.65 | 165 | 45 | 48 |
| 9 | 90 | 1.68 | 180 | 47 | 50 |

In this Example, the moduli of shear obtained by the tortional vibration method of DIN 53,455, of copolyesters according to the invention are compared with those of polybutylene terephthalate and with copolyester A, the measurements being carried out at various temperatures. The values obtained are listed in Table 2. They show that the moduli of shear of the copolyesters of the invention are higher, especially at high temperatures, than those of polybutylene terephthalate. This means that moldings based on the copolyesters of the invention have higher heat distortion points than polybutylene terephthalate.

TABLE 2

| Polyester | Mole % of but-2-ene-1,4-diol | $\eta_{rel}$ | Modulus of shear [Newton/mm²] at | | | | |
|---|---|---|---|---|---|---|---|
| | | | 60° C | 80° C | 100° C | 120° C | 140° C |
| Polybutylene terephthalate | — | 1.66 | 300 | 180 | 120 | 102 | 90 |
| Copolyester A | — | 1.58 | 50 | 30 | — | — | 10 |
| Copolyesters of the invention | | | | | | | |
| 1 | 20 | 1.685 | 510 | 320 | 250 | 200 | 150 |
| 2 | 30 | 1.690 | 500 | 310 | 250 | 200 | 150 |
| 3 | 40 | 1.60 | 400 | 260 | 190 | 150 | 103 |
| 4 | 50 | 1.58 | 390 | 250 | 190 | 150 | 102 |

EXAMPLE 4

This Example shows that the copolyesters of the invention crystallize at comparable rates to polybutylene terephthalate. Differential scanning calorimetry was used as the method of measurement. Small amounts of samples were heated to 20° C above their crystallite melting point and left at this temperature for 0.5 minute. The samples were then cooled at a rate of 32° C/min. The crystallization enthalpy which occurred during crystallization was measured and recorded. The diagram of the measurements gives a curve. The surface area of which is proportional to the crystallization enthalpy. The start of this curve, and its maximum, are listed in Table 3. The sooner the crystallization starts during cooling of the polyester melt, the greater is the rate of crystallization of the melt, and the smaller are the temperature differences between the start of crystallization and the crystallite melting point, and between the maximum of the measured curve, and the crystallite melting point.

$\Delta T_C$ is the difference between the crystallite melting point and the temperature at which crystallization starts, and $\Delta T_{CMAX}$ is the difference between the crystallite melting point and the maximum of the measured curve.

TABLE 3

| Polyester | Mole % of but-2-ene-1,4-diol | $\eta_{rel}$ | $\Delta T_C$[° C] | $\Delta T_{CMAX}$[° C] |
|---|---|---|---|---|
| Polybutylene terephthalate | — | 1.66 | 33 | 55 |
| Copolyester A | — | 1.58 | 45 | 74 |
| Copolyesters of the invention | | | | |
| 1 | 16 | 1.64 | 30 | 49 |
| 2 | 20 | 1.685 | 31 | 48 |
| 3 | 30 | 1.69 | 29 | 55 |
| 4 | 40 | 1.60 | 27 | 51 |
| 5 | 50 | 1.58 | 30 | 50 |
| 6 | 60 | 1.57 | 29 | 47 |
| 7 | 90 | 1.68 | 31 | 46 |

EXAMPLE 5

Table 4 shows notched impact strength values, measured on speciments drilled with a hole (see below), of the copolyesters of the invention, as a function of the material temperature used when injection molding the specimens, in comparison to results on polybutylene terephthalate. In all experiments, the mold temperature was kept constant at 60° C. The size of the test specimens was 4 × 6 × 50 mm.

The impact strength of specimens with a drilled hole was measured on injection moldings at 23° C, by a method based on DIN 53,453. A hole of 3 mm diameter was drilled in the centr of the 6 × 50 mm surface of the standard small bars. The notched impact strength of specimens with a hole, $a_{HN}$, in kilojoule/m², is then measured by the same method as in DIN 53,453, the specimen being struck in the lengthwise direction of the hole. This test permits very precise differentiation of the impact strengths of the test specimens.

The measurements in Table 4 show that the impact strengths, obtained as above, of the copolyesters of the invention change less, over a wide range of processing temperatures, than do those obtained when using polybutylene terephthalate, and above all are higher than for the latter material.

TABLE 4

| Polyester | Mole % of but-2-ene-1,4-diol | $\eta_{rel}$ | Material temperature[° C] | Notched impact strength of specimens with a drilled hole [kilojoule/m²] |
|---|---|---|---|---|
| Polybutylene terephthalate | — | 1.66 | 240 | 55 |
| | | | 260 | 45 |
| | | | 280 | 32 |
| Copolyesters of the invention | | | | |
| 1 | 20 | 1.685 | 220 | 52 |
| | | | 240 | 53 |
| | | | 260 | 45 |
| | | | 280 | 38 |
| 2 | 30 | 1.690 | 220 | 49 |
| | | | 240 | 55 |
| | | | 260 | 48 |
| | | | 280 | 39 |
| 3 | 40 | 1.60 | 220 | 45 |
| | | | 240 | 46 |
| | | | 260 | 39 |
| | | | 280 | 35 |
| 4 | 50 | 1.58 | 220 | 48 |
| | | | 240 | 50 |
| | | | 260 | 42 |
| | | | 280 | 35 |
| 5 | 60 | 1.57 | 220 | 53 |
| | | | 240 | 52 |
| | | | 260 | 46 |
| | | | 280 | 38 |
| 6 | 70 | 1.68 | 220 | 43 |
| | | | 240 | 46 |
| | | | 260 | 40 |
| | | | 280 | 31 |

EXAMPLE 6

This example shows that the rigidity of the copolyesters of the invention is increased by admixture of glass fibers. Chopped glass fibers of diameter about 10 μ and of mean length from 0.2 to 0.4 mm were mixed with a copolyester at a material temperature of 240° C in a type ZDSK 28 extruder. The glass fibers were provided with an organosilane-based adhesion promotor. The mixtures were extruded through dies and the strands obtained were passed through a waterbath and then granulated. The granules were dried carefully and then used to produce test specimens on an injection molding machine, the material temperature being 250° C and the mold temperature 60° C. The impact strength was tested in accordance with DIN 53,453. The modulus of elasticity and the tensile strength were measured according to DIN 53,455 and the flexural strength according to DIN 53,452.

Table 5 shows the mechanical properties of a copolyester of the invention, containing 30 mole % of but-2-ene-1,4-diol, $\eta_{rel} = 1.69$, as a function of the glass fiber content, in comparison to a nonreinforced polyester.

In the Table, the symbols denote:
$\alpha N$ — impact strength
E — modulus of elasticity
$\sigma$ — tensile strength
$\sigma_B$ — flexural strength the emulsion polymer is from 200 to 400 $\mu$. The glass transition temperature is from about $-35°$ to $-40°$ C.

The main chain of grade B is a copolymer consisting of butyl acrylate, butadiene and methyl vinyl ether. Branches, consisting of 70% by weight of styrene and 30% by weight of acrylonitrile, are grafted onto the main chain, the degree of grafting being 25%. The particle diameter is from 100 to 200 $\mu$ and the glass transition temperature is from $-55°$ to $-60°$ C.

The graft copolymers of type A or B, used in amounts of from 0.1 to 20% by weight, preferably of from 2 to 10% by weight, in a mixture with polyester molding compositions, produce an exceptional increase in impact strength, even at temperatures of about $-40°$ C. The incorporation of more than 20% by weight of the above graft copolymers into the polyester molding composition is of no advantage, since, though the impact strength is increased further, the E modulus and

TABLE 5

| Glass fiber content % by weight | E [Newton/mm$^2$] | $\alpha_N$ [Kilojoule/m$^2$] | $\sigma$ [Newton/mm$^2$] | $\sigma$ [Newton/mm$^2$] |
|---|---|---|---|---|
| 0 | 2,730 | does not fracture | 58 | 85 |
| 20 | 6,600 | 35 | 105 | 160 |
| 30 | 9,700 | 33 | 125 | 195 |
| 40 | 12,800 | 30 | 140 | 218 |

EXAMPLE 7

Example 7 shows, for typical compositions, that the copolyesters of the invention, mixed with other polymers, exhibit greatly increased impact strengths. The copolyesters of the invention were mixed with 10% by weight of the stated polymers, at a material temperature of 240° C, using a type ZDSK 28 extruder. The mixtures were extruded through dies and the strands obtained were passed through a waterbath and then granulated. The carefully dried granules were used to mold the test specimens required for the DIN test, on an injection molding machine, with a material temperature of 240° C and a mold temperature of 60° C.

The polycarbonate employed was grade Makrolon 3200 of Bayer AG, which has a relative solution viscosity of 1.37.

The grades of graft rubber listed in Example 7 have the following characteristics:

Grade A has a main chain consisting of a copolymer of n-butyl acrylate and tricyclodecenyl acrylate, onto which branches composed of 75% by weight of styrene and 25% by weight of acrylonitrile are grafted. The degree of grafting is 30%, and the particle diameter of the breaking stress then become so low that they are inadequate for many uses.

The following products were employed as poly(ether-esters): Grade C consists of 60 mole % of polyester units, with terephthalic acid as the dicarboxylic acid and butane-1,4-diol as the diol component. As the soft component, the poly(ether-ester) contains 40 mole % of polytetrahydrofuran blocks which have a mean molecular weight of about 900 and are statistically distributed between the polyester units.

The crystallite melting point is 216° C and the relative solution viscosity is 1.66.

Grade D differs from grade C in that it contains 40 mole % of polyester structural units and 60 mole % of polytetrahydrofuran blocks. The crystallite melting point of this poly(ether-ester) is 195° C and the relative solution viscosity is 1.73.

The impact strengths were measured at test temperatures of 23° C, 0° C, $-20°$ C and $-40°$ C, as in Example 5.

The measurements obtained are listed in Table 6.

The Comparative Samples were extruded, and injection-molded, under the same conditions, but without additives.

TABLE 6

| | | Notched impact strength, of specimens with a drilled hole, in Kilojoule/m$^2$, of mixtures containing 10% by weight of the stated polymers | | | | | |
|---|---|---|---|---|---|---|---|
| Copolyesters of the invention | Temperature of measurement ° C | Makrolon 3200 | Graft rubber | | Poly(ether-ester) | | Copolyesters of the invention, without addition of other polymers |
| | | | Grade A | Grade B | Grade C | Grade D | |
| 20 mole % of but-2-ene-1,4-diol | 23 | 50 | 60 | 64 | 47 | 40 | 46 |
| | 0 | 45 | 58 | 62 | 43 | 42 | 44 |
| | −20 | 37 | 44 | 50 | 35 | 42 | 33 |
| $N_{rel} = 1.695$ | −40 | 23 | 25 | 31 | 33 | 39 | 10 |
| 30 mol % of but-2-ene-1,4-diol | 23 | 47 | 53 | 60 | 40 | 40 | 42 |
| | 0 | 41 | 50 | 80 | 39 | 40 | 39 |
| | −20 | 33 | 40 | 46 | 32 | 37 | 28 |
| $N_{rel} = 1.69$ | −40 | 20 | 23 | 28 | 29 | 35 | 10 |
| 40 mol % of but-2-ene-1,4-diol | 23 | 40 | 46 | 53 | 35 | 31 | 32 |
| | 0 | 35 | 44 | 50 | 30 | 36 | 29 |
| | −20 | 28 | 29 | 35 | 28 | 38 | 19 |
| $N_{rel} = 1.61$ | −40 | 18 | 22 | 30 | 25 | 35 | 8 |

EXAMPLE 8

Example 8 shows that the heat-aging resistance of the copolyesters of the invention can be improved substantially, compared to an unstabilized product, by adding a combination of a sterically hindered phenol and a polycarbodiimide. A copolyester containing 20 mole % of but-2-ene-1,4-diol ($\eta_{rel} = 1.695$) was employed, and 0.3% by weight of the compound

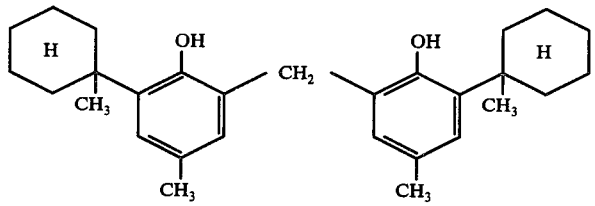

and 1% by weight of "Stabaxol" polycarbodiimide from Bayer AG were incorporated into the melt by means of an extruder.

To test the heat-aging resistance, the test specimens, together with specimens produced under identical conditions from the unstabilized copolyester, were stored at 140° C in a through-circulation dryer. The decrease in the notched impact strength of specimens with a drilled hole after various storage times was tested. The mechanical test was carried out as described in Example 5, at 23° C. The measurements obtained are listed in Table 7.

TABLE 7

| Storage time [days] | Notched impact strength of specimens with a drilled hole in kilojoule/m² | |
|---|---|---|
| | Unstabilized | Stabilized |
| 0 | 48 | 51 |
| 3 | 33 | 45 |
| 6 | 15 | 42 |
| 10 | 8 | 38 |
| 15 | 6 | 34 |
| 20 | 3 | 32 |
| 30 | 3 | 29 |
| 40 | 3 | 25 |

We claim:

1. Polyesters manufactured by polycondensing terephthalic acid or its lower alkyl esters with butane-1,4-diol and from 10 to 80 mole % of but-2-ene-1,4-diol, based on the total amount of diol employed, and which have a relative viscosity of not less than 1.4, measured in 0.5% strength solution in a mixture of phenol and o-dichlorobenzene in a weight ratio of 3:2, at 25° C.

2. Polyesters as set forth in claim 1, which are obtained by polycondensation at below 240° C and preferably below 230° C.

3. Thermoplastic molding compositions, which consist of a mixture of polyesters as set forth in claim 1 and other polymers.

4. Thermoplastic molding compositions, which consist of a mixture of polymers as set forth in claim 1 with up to 20%, based on the total composition, of polymers which have a glass transition temperature below 20° C.

5. Thermoplastic molding compositions as set forth in claim 1, which contain up to 50% by weight of fillers or reinforcing fibers having a diameter of less than 20 μ.

6. Thermoplastic molding compositions as set forth in claim 1, which contain, as stabilizers, from 0.05 to 5% by weight of a phosphorus compound and/or of sterically hindered phenols and/or carbodiimides or polycarbodiimides.

7. Thermoplastic molding compositions as set forth in claim 1, which contain up to 1% by weight of a finely divided additive of particle size less than 100 μ, preferably talc, as a crystallization accelerator.

8. Thermoplastic molding compositions as set forth in claim 1, wherein the molar ratio of terephthalic acid to diol mixture is from 1:1.2 to 1:2.

UNITED STATES PATENT AND TRADEMARK OFFICE
CERTIFICATE OF CORRECTION

PATENT NO. : 4,081,422
DATED : March 28, 1978
INVENTOR(S) : CLAUS CORDES ET AL

It is certified that error appears in the above-identified patent and that said Letters Patent are hereby corrected as shown below:

First page, left-hand column, Assignee should read
--BASF Aktiengesellschaft--.

Signed and Sealed this

Seventh Day of November 1978

[SEAL]

Attest:

RUTH C. MASON
Attesting Officer

DONALD W. BANNER
Commissioner of Patents and Trademarks